No. 823,100. PATENTED JUNE 12, 1906.
F. G. BONFILS.
AERIAL BICYCLE.
APPLICATION FILED APR. 29, 1904.
2 SHEETS—SHEET 1.
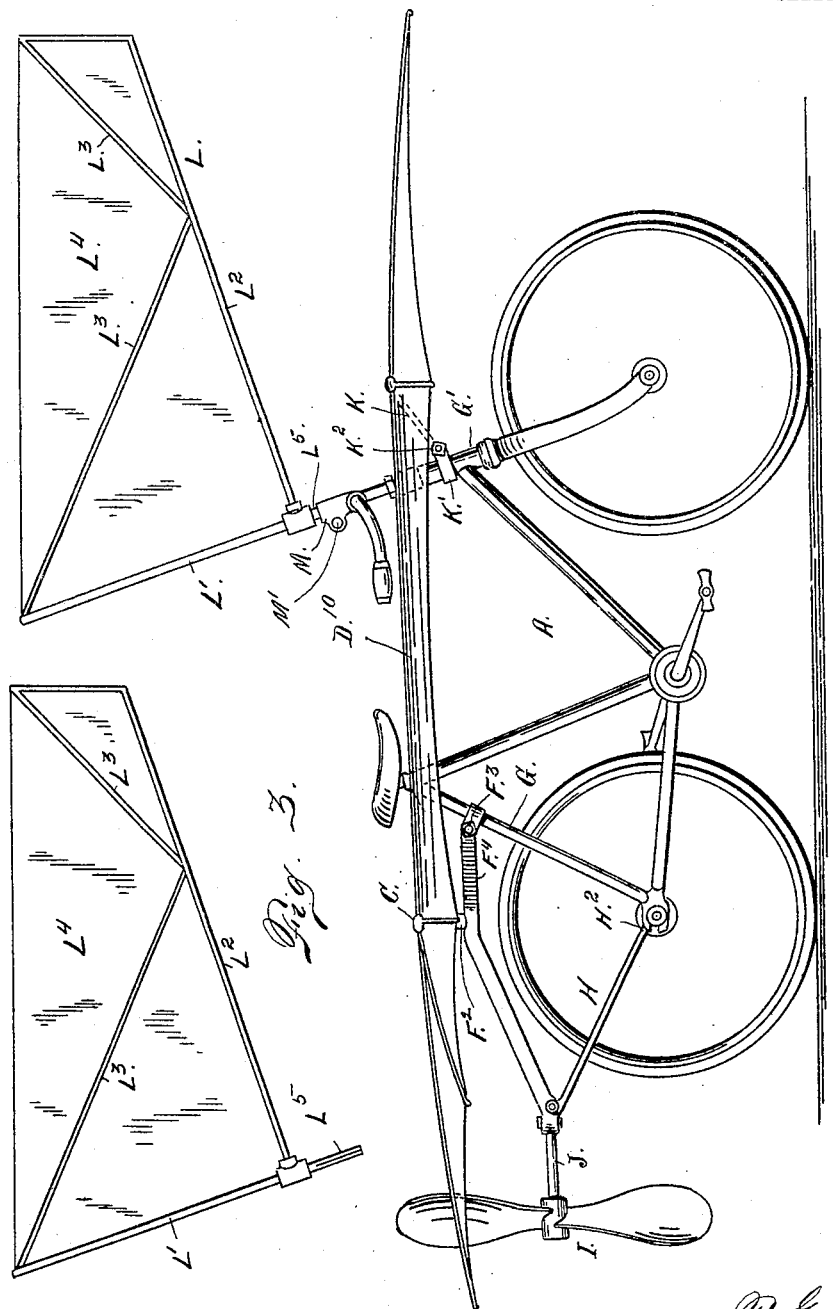

No. 823,100. PATENTED JUNE 12, 1906.
F. G. BONFILS.
AERIAL BICYCLE.
APPLICATION FILED APR. 29, 1904.
2 SHEETS—SHEET 2
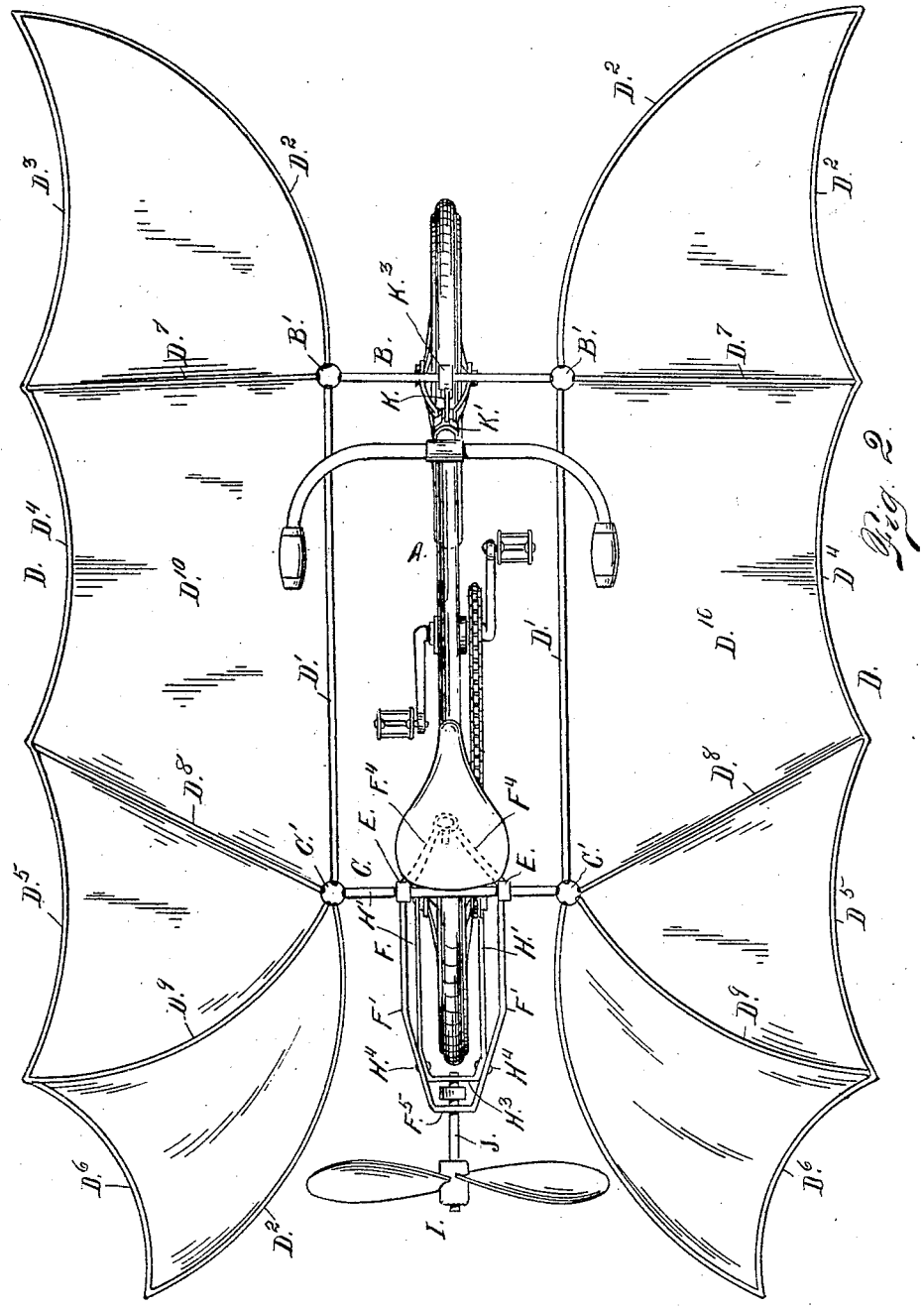

UNITED STATES PATENT OFFICE.

FREDERICK G. BONFILS, OF DENVER, COLORADO.

AERIAL BICYCLE.

No. 823,100.

Specification of Letters Patent.

Patented June 12, 1906.

Application filed April 29, 1904. Serial No. 205,638.

*To all whom it may concern:*

Be it known that I, FREDERICK G. BONFILS, a citizen of the United States of America, residing in the city and county of Denver and State of Colorado, have invented certain new and useful Improvements in Aerial Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.
My invention relates to improvements in bicycles provided with wing-like or air-plane attachments, whereby the bicycle after getting a considerable start down an incline, for instance, may sail through the air a considerable distance before again striking the track, it being assumed that there is a gap in the track to permit the machine to make a jump through space. The wings or air planes, which project outwardly on opposite sides of the bicycle-frame, enable the machine to take a longer flight than could be accomplished in their absence. To the rear extremity of the frame of the bicycle and centrally located is a revolving wind-wheel which has a tendency to steer the machine during its flight through the air and also adds to the novelty of its appearance. In looping the loop on a bicycle the track may be cut away at the top whereby an ordinary bicycle jumps through space and again lands on the track. This feat is now accomplished by a rider on an ordinary bicycle. It is believed that a machine of the character shown in the drawings and hereinafter explained may be made to jump or pass through a greater space than can be accomplished on a wheel not so equipped. It is further believed that my improved machine will be found capable of use in the performance of many feats not heretofore accomplished on a machine of ordinary construction or unequipped with my improvements.

Having briefly outlined my improved construction, as well as the function it is intended to perform, I will proceed to describe the same in detail, reference being made to the accompanying drawings, in which is illustrated an embodiment thereof.

In the drawings, Figure 1 is a side elevation of a bicycle equipped with my improvements. Fig. 2 is a top or plan view of the same without the rudder or steering device. Fig. 3 is a detail view of the rudder or steering device.

The same reference characters indicate the same parts in all the views.

Let A designate a bicycle of ordinary construction. To the upper part of the framework of this machine are attached two horizontal bars, (designated B and C, respectively.) These bars extend a suitable distance on opposite sides of the vertical plane of the bicycle and terminate in balls or enlargements B' and C', there being a ball C' and a ball B' on each side of the bicycle. With these balls are connected the wings D of the machine, which are composed of a suitable comparatively light framework to which is attached a covering of canvas or other suitable material. As shown in the drawings, these wings are composed of parallel longitudinal bars D', located on opposite sides of the machine, having their extremities connected with the balls B' and C', respectively. Also connected with these balls are front and rear ribs $D^2$, outer ribs $D^3$, $D^4$, $D^5$, and $D^6$ and transverse ribs $D^7$, $D^8$, and $D^9$. The canvas covering $D^{10}$ is attached to the ribs. In this manner wings or air planes of any desired area may be connected with the opposite sides of the bicycle.

The rearwardly-located bar C is journaled in bearings E, mounted on a frame F, composed of two side bars F', each of which is provided with an upright part $F^2$ at its forward extremity, upon which the bearings E are mounted. This frame F is also connected at its forward extremity with the rear frame-bar G of the bicycle by means of a clasp $F^3$, which is connected with two short bars $F^4$. (Indicated by dotted lines in Fig. 2.) The rear extremities of the parts F' are connected as shown at $F^5$. This frame F is further supported by an auxiliary frame or brace H, composed of parallel side bars H', whose forward extremities are connected with the main frame, as shown at $H^2$, and whose rear extremities are connected by a part $H^3$. The members of the brace H are connected with the frame F on each side, as shown at $H^4$.
A wind-wheel I is connected with a shaft J, the latter being journaled in the parts $H^3$ and $F^5$. As the machine passes along the resistance of the atmosphere will cause the wind-wheel to revolve, thus forming a sort of steering device for the machine, which by its rapid motion tends to steady the bicycle and prevent it from swerving from its course.

The front transverse bar B is connected with a head G' of the bicycle by means of a link K. This link is connected with a clamp K' by means of a bolt K², which passes through an opening in the end of the link and also between registering openings in the clamp K'. The opposite extremity of the link K is connected with a transverse bar B by means of a bearing K³, in which the bar B is loose. By loosening the nut on the bolt K² the forward extremities of the wings may be raised and lowered at pleasure, after which the nut may be tightened and the wings secured in any desired position of adjustment. As the forward extremities of the wings are raised and lowered the bar C, which is rigidly connected with the wings, turns in the bearings E.

From the foregoing description the use and operation of my improved aerial bicycle will be readily understood. The rider sits upon the machine the same as upon an ordinary bicycle, there being sufficient room between the frame-bars D' for the legs of the rider to pass downwardly to the pedals and to give perfect freedom of movement for the purpose of operating the machine. The machine will run as the ordinary bicycle until the gap or break in the track is reached, when it will sail through the air by virtue of the wings or air planes on opposite sides and assisted by the wind-wheel connected with its rear extremity, as heretofore described.

Under some circumstances it may be advisable to use a rudder or steering device detachably connected with the handle-bar of the bicycle, as shown in Fig. 1. As shown in the drawings, this rudder consists of an upwardly-extending post L', to whch is connected a frame composed of ribs L² and L³, forming a support for the canvas covering L⁴. The lower extremity of the post L' is slotted and adapted to enter a clamp M, in which it may be secured by the employment of a fastening device, as a bolt M'. This rudder or steering device may be set at different angles, according to the direction of the wind, and by the use of it the rider may be able to steer the bicycle in a direct path under circumstances which would make such steering otherwise difficult.

Having thus described my invention, what I claim is—

1. The combination with a bicycle-frame, of bars located on opposite sides of said bicycle-frame, and wings or air planes carried by said bars, substantially as described.

2. The combination with a bicycle-frame, of adjustable bars located on opposite sides of said bicycle-frame and wings or air planes carried by said bars, substantially as described.

3. The combination with a bicycle-frame, of bars located on opposite sides thereof, said bars being pivoted at one end to said frame, and wings or air planes carried by said bars, substantially as described.

4. The combination with a bicycle-frame of parallel bars located on opposite sides thereof, a transverse bar journaled to said frame and connected at its ends to said parallel bars and wings or air planes carried by said parallel bars, substantially as described.

5. The combination with a bicycle-frame, of two transverse bars projecting on opposite sides of the frame, the rear bar being journaled in a suitable support, and an adjustable supporting device for the forward transverse bar whereby the forward bar may be raised and lowered at will, and wings or air planes connected with the extremities of the bars and located on opposite sides of the machine.

6. The combination with a bicycle, of wings or air planes attached to the opposite sides of the framework of the machine, and a rudder or steering device detachably connected with the handle-bar above the plane of said wings and consisting of a frame provided with a suitable covering, substantially as described.

7. The combination with a bicycle-frame and wings or air planes secured to the opposite sides of said frame, of a post secured to the steering-head of said frame and a vertically-extending wing or rudder carried by said post, substantially as described.

8. The combination with a bicycle and wings or air planes secured thereto, of a rudder consisting of a post in alinement with the steering-head of said bicycle, a vertically-extending wing carried by said post and a clamp for securing said post to the handle-bars of said bicycle, substantially as described.

9. The combination with a bicycle-frame, of a rectangular frame mounted thereon, wings or air planes carried by said rectangular frame, a supporting-frame mounted on the rear of said bicycle-frame, bearings carried by said supporting-frame and adapted to receive one end of said rectangular frame, and a wind-wheel rotatably mounted in said supporting-frame, substantially as described.

In testimony whereof I affix my signature in presence of two witnesses.

FREDERICK G. BONFILS.

Witnesses:
 DENA NELSON,
 A. J. O'BRIEN.